March 8, 1927.  
S. NAKAGAWA  
1,619,879  
COMBINED SIDE WING AND SUN AND RAIN SHIELD FOR AUTOMOBILES  
Filed Feb. 2, 1926
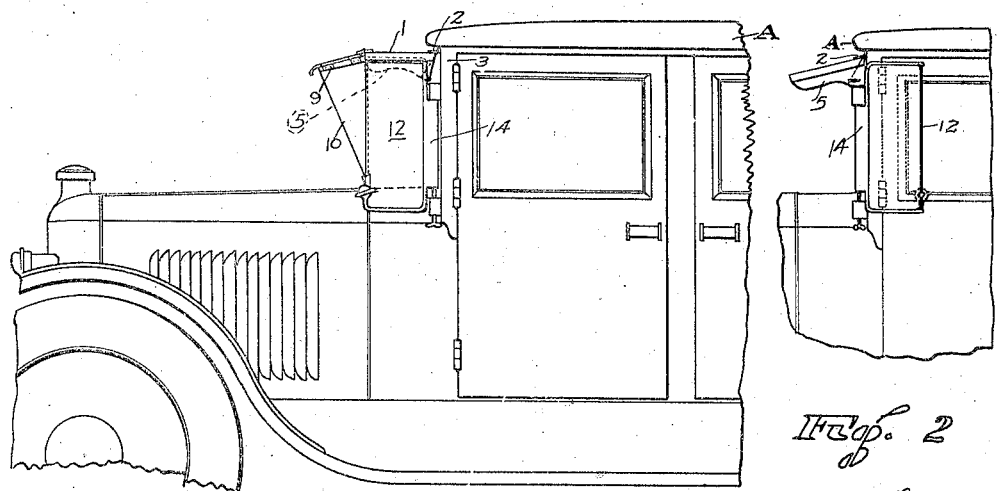
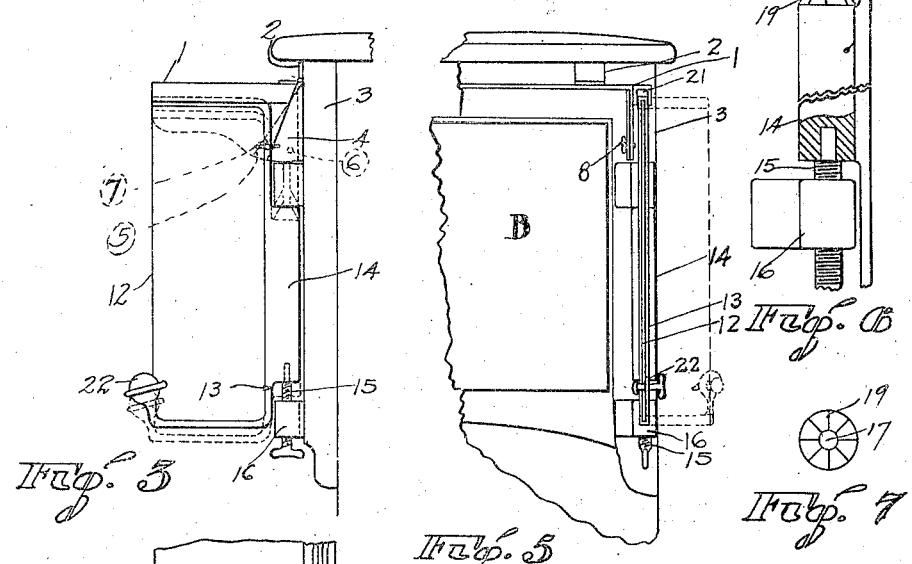
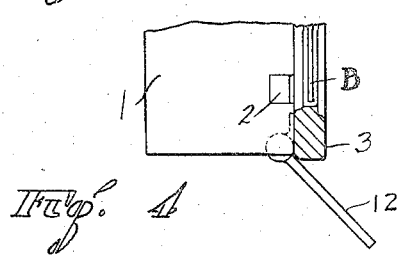
INVENTOR  
S. NAKAGAWA  
BY  
ATTY.

Patented Mar. 8, 1927.

1,619,879

UNITED STATES PATENT OFFICE.

SHOICHI NAKAGAWA, OF SAN JOSE, CALIFORNIA.

COMBINED SIDE WING AND SUN AND RAIN SHIELD FOR AUTOMOBILES.

Application filed February 2, 1926. Serial No. 85,431.

This invention relates to a combined side wing and sun and rain shield for automobiles, it being an improvement of the sun and rain shield of the type disclosed in my U. S. Letters Patent granted January 26, 1926, No. 1,570,701, for sun and rain shield for automobiles.

The primary purpose of this invention is to provide an accessory of the character described which may be readily and easily attached to the ordinary automobile and which in addition to serving as an effective sun shield and rain or storm shield may be adjusted to provide adjustable side wings which will extend outwardly and rearwardly from the automobile windshield, these side wings being provided when the accessory is not required for use as a rain or storm shield.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 represents a fragmentary side elevation of an automobile showing my invention thereon.

Fig. 2 is a view similar to Fig. 1 but showing the apparatus of my invention adjusted to provide side wings (windshields).

Fig. 3 represents an enlarged side elevation of the apparatus of my invention, showing the method of adjusting it to provide side wings.

Fig. 4 represents a fragmentary top plan view of the apparatus at end thereof.

Fig. 5 represents a fragmentary front elevation of the invention.

Fig. 6 represents an enlarged front elevation partly in section of the mountings of the side pieces.

Fig. 7 represents a top plan view of one of the side piece pivots.

The form of the invention shown in the accompanying drawing comprises a rectangular shield or plate 1 which is hinged along its rear edge as at 2, to the upper part of the windshield frame 3 of an automobile shown at A. This plate extends substantially horizontally and forwardly of the windshield B of the automobile and serves as a sun shield to prevent glaring sun rays from interfering with the driver's vision and also prevents rain and snow from being blown onto the automobile windshield. Extending outwardly from the windshield frame 3 adjacent the ends of the plate 1 are small attaching plates 4 of circular shape, the outer sides of which are engaged by flanges 5 which depend from the ends of the plate 1. The plates 4 are provided with spaced openings 6 that register with similar openings 7 in the flanges 5. Thumb screws 8 are inserted through the openings 6 and into the openings 7 to hold the plate 1 in the position into which it is moved. When the thumb screws are in the outermost openings 7, the plate 1 will be in horizontal position and the innermost openings 6 will be in the inclined position shown in Fig. 2, the purpose of which will be later more fully explained.

Hinged on the forward edge of the plate 1 is an adjustable visor plate 9 adapted to incline downward so as to afford a more effective sun shield and rain shield as well. Glass side wings 10 are hinged at their upper ends to the ends of this plate 9 and when not in use are adapted to be folded up upon the under side of the plate 9, which latter swings under and may be secured to the plate 1. This arrangement is described in my Patent No. 1,570,701 previously referred to.

Side shields 12 are mounted in front of the windshield frame 3 at the ends of the plate 1 and are adapted, with the plates 10, both being of glass, to prevent rain and snow from blowing sidewise under the plates 1 and 9 onto the windshield B. These plates 12 are arranged so that they may be adjusted to extend outward and rearward from the ends of the windshield frame 3 as shown in Figs. 2 and 4 and to serve when in this position, as side wings.

The side shields 12 are, in the present instance, formed of rectangular glass plates mounted in frames 13 which extend along the rear and upper and lower edges of the plates and have the glass secured thereto in any suitable manner. The frames 13 have rearward extensions 14, rotatably joined to the lower ends of which are screw trunnions 15 which are turned in supporting ears 16 carried by the frame 3. On the upper ends of the extensions 14 are trunnions 17 rotatably mounted in similar ears 18. The lower portions of the trunnions 17 are octagonal and frusto-conical in form as shown at 19 and the opening in the ear is similarly shaped as shown at 20. When the screw trunnions 17 are screwed up they lift the frame 13 and side wings 12 and dispose the upper ends of the frames and wings within the channel shaped keepers 21 provided on the ends of the plate 1. The parts 19 and 20 engaging with one another prevent turning of the frames and in this way the frames and side wings may be securely locked in position to cooperate with the plates 1 and 9 and the wings 10, whereby there will be formed a sun and rain shield as shown in Fig. 1.

At the lower ends of the frames 13 are screw operated clamps 22 arranged to receive and clamp the lower ends of the wings 10 as shown in Fig. 1, with the wings lying against the inner sides of the side shields 12. With the trunnion arranged as shown in Fig. 1, the shield plates 1 and 9 prevent the sun rays from passing through the windshield so as to blind or confuse the driver and at the same time will prevent rain and snow from blowing down upon the automobile windshield. The wings 10 and side pieces 12 prevent rain and snow from blowing sidewise onto the windshield and do not interfere with the driver's vision because they are formed of glass. When it is desired to dispense with the side shields 10 and extension plate 9 as shielding means, the wings 10 are folded up on the under side of the plate 9 and said plate is swung rearward on its hinges so as to lie beneath the plate 1. With the parts in this position, should it be desired to use the side pieces 12 as side windshields or side wings extending outwardly and rearwardly from the side extremities of the main windshield, the screw trunnions 15 are unscrewed so as to lower the frames 13 and side wings sufficiently to withdraw the upper edges of the frames from the keepers 21 and to move the portions 19 and 20 of the mounting out of engagement with one another as shown in Fig. 6. With the parts in this position, the wings can then be swung into the desired outward and rearwardly extending position as shown in Figs. 2 and 4. The wings may be locked in this position by screwing up on the trunnions 15 and causing the portions 19 and 20 of the mounting to lock one against the other to prevent movement of the frames relative to the mounting.

By the construction of this accessory not only is there provided an effective sun and rain shield which is subject to various adjustments dependent upon the shielding effect desired but also there is provided a side windshield or side wing arrangement which is subject to use when the accessory is not to be used as a storm or rain shield. The plate 1 may be adjusted so that it will incline downwardly and forwardly as shown in Fig. 2 when the side shields 12 are moved into position to serve as side wings or windshield extensions. This downward inclination of the main shield plate 1 compensates for the folding in of the visor plate 9 and provides for an effective sun shield.

I claim:

1. A sun and rain shield for automobiles comprising a plate adapted to be secured to the upper portion of a windshield of an automobile and to project outwardly therefrom, glass side shields detachably joined to the ends of said plate and extending downwardly therefrom, frames supporting said upright glass side shields disposed adjacent the ends of said plate, which side shields are movable vertically into and out of position of engagement with said plate and means for rotatably and vertically adjustably supporting said side shields providing for movement of the side shields into position extending outwardly and rearwardly from the sides of the automobile.

2. A sun and rain shield for automobiles comprising a plate adapted to be secured to the upper portion of a windshield of an automobile and to project outwardly therefrom, glass side shields detachably joined to the ends of said plate and extending downwardly therefrom, frames supporting said upright glass side shields disposed adjacent the ends of said plate, which side shields are movable vertically into and out of position of engagement with said plate, means for rotatably and vertically adjustably supporting said side shields providing for movement of said shields into position extending outwardly and rearwardly from the sides of the automobile and means for locking said side shields in either position.

3. A sun and rain shield comprising a plate adapted to be secured to the upper portion of a windshield of an automobile and to extend outwardly therefrom, upright glass side shields disposed beneath said plate adjacent the ends of the latter, channel shaped members at the ends of said plate into and out of engagement with which said glass side shields are adapted to be moved, means for rotatably and vertically adjustably supporting said side plates upon the automobile at a point adjacent the sides of the windshield of the automobile and providing for movement of said shields into position extending outwardly and rearwardly from said plates.

4. The combination with an automobile having a windshield and a windshield frame, of a shield plate hinged to said frame and extending outwardly in front of the windshield adjacent the upper end of the latter, glass side shields disposed in upright position beneath the shield plate adjacent the ends of the latter, frames supporting said side shield, which frames are vertically adjustably and pivotally mounted upon the windshield frame and provide for movement of said glass shields into and out of engagement with said plate and into position extending outwardly and rearwardly from the windshield frame and keeper members on said plate with which said side shield frames engage.

5. The combination with an automobile having a windshield and a windshield frame, of a shield plate hinged to said frame and extending outwardly in front of the windshield adjacent the upper end of the latter, glass side shields disposed in upright position beneath the shield plate adjacent the ends of the latter, frames supporting said side shield, which frames are vertically adjustably and pivotally mounted upon the windshield frame and provide for movement of said glass shields into and out of engagement with said plate and into position extending outwardly and rearwardly from the windshield frame, keeper members on said plate with which said side shield frames engage, an extension plate hinged to the forward edge of the first named plate and glass side wings hinged to the ends of and depending from said extension plate, which last named side wings are adapted to serve as extensions of the first named side wings.

SHOICHI NAKAGAWA.